United States Patent [19]
Moore et al.

[11] Patent Number: 5,873,498
[45] Date of Patent: Feb. 23, 1999

[54] RAILWAY LOCOMOTIVE FUEL SERVICE TRUCK

[75] Inventors: Lawrence Daniel Moore, Evergreen; Michael Dale Gordon, Thornton, both of Colo.; R. Steve Creamer, Bountiful, Utah

[73] Assignee: Quality Rail Services, L.C., Golden, Colo.

[21] Appl. No.: 871,051

[22] Filed: Jun. 9, 1997

Related U.S. Application Data

[60] Provisional application No. 60/019,960 Jun. 14, 1996.
[51] Int. Cl.⁶ .................................. B65B 1/04; B65B 3/04
[52] U.S. Cl. .................. 222/181.2; 222/559; 222/561; 141/114
[58] Field of Search ................................. 222/181.2, 559, 222/561, 92; 383/97, 62, 67; 141/114, 386, 387

[56] References Cited

U.S. PATENT DOCUMENTS

| | | | |
|---|---|---|---|
| 2,222,083 | 11/1940 | Lintz | 222/181.2 |
| 2,740,445 | 4/1956 | Fornell | 383/67 |
| 3,318,473 | 5/1967 | Jones et al. | 222/561 |
| 4,811,419 | 3/1989 | Derby | 383/67 |
| 4,966,311 | 10/1990 | Taylor | 222/181.2 |

OTHER PUBLICATIONS

Fax letter and attached drawing dated Oct. 31, 1995 from Fleet Body Equipment, Kansas City, MO.

*Primary Examiner*—Steven O. Douglas
*Attorney, Agent, or Firm*—John R. Wahl; Holland & Hart LLP

[57] ABSTRACT

A Locomotive fuel service truck is disclosed which comprises a motor vehicle having an elongated frame, a crane arm carried on the frame, at least one fuel pump carried by the frame connectable to a fuel oil storage tank and a fuel hose having one end connected to the pump and another end adapted to fit into a railroad diesel locomotive fuel tank, and at least one removable sand hopper carried on the frame connectable to said crane arm. The crane arm is adapted to lift and position the sand hopper over a sand pot on a diesel locomotive while fuel is being dispensed from a fuel storage tank to a locomotive fuel tank. The fuel oil storage tank may be located underground or on a trailer towed by the service truck. Another embodiment of the service truck includes a fuel oil storage tank carried on the truck frame so that the service truck can completely supply all materials and fluids to replenish a diesel locomotive without having to bring additional trucks to the site of the locomotive. Both embodiments carry air compressors, welders and equipment sufficient to perform minor maintenance and repair activities on site without having to disconnect the locomotive from the train of train cars. A reusable sand hopper bag is also disclosed having a sliding gate plate discharge valve assembly which fastens to a flanged upper end of a sand transfer hose for filling the locomotive sand pots.

12 Claims, 11 Drawing Sheets

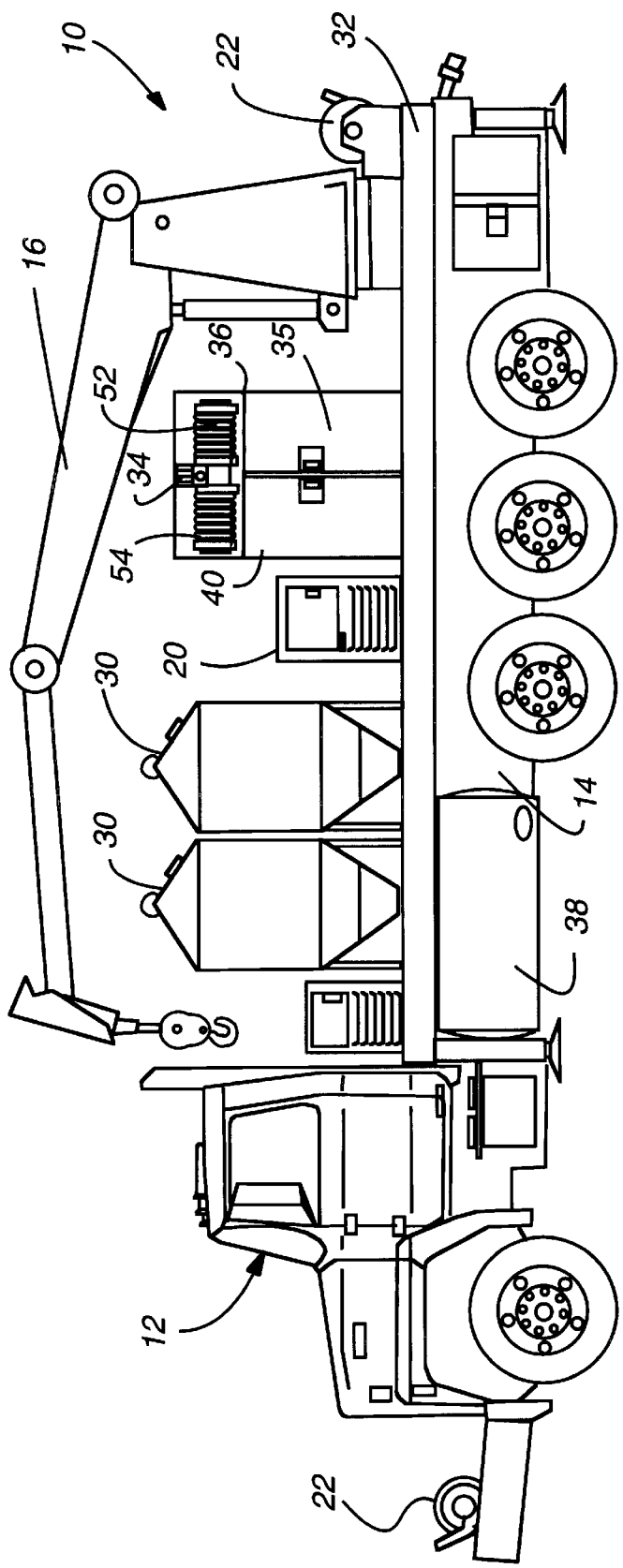
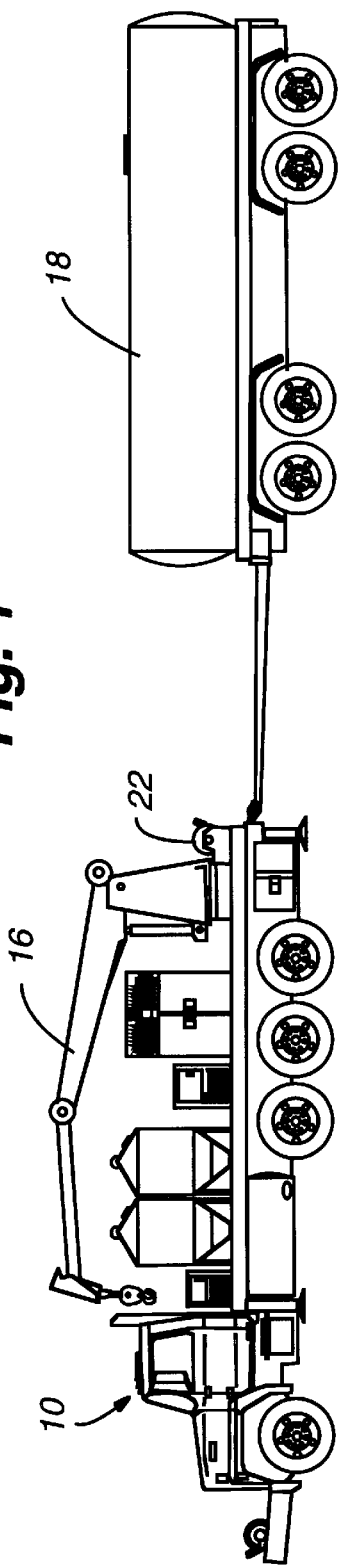
Fig. 1
Fig. 2

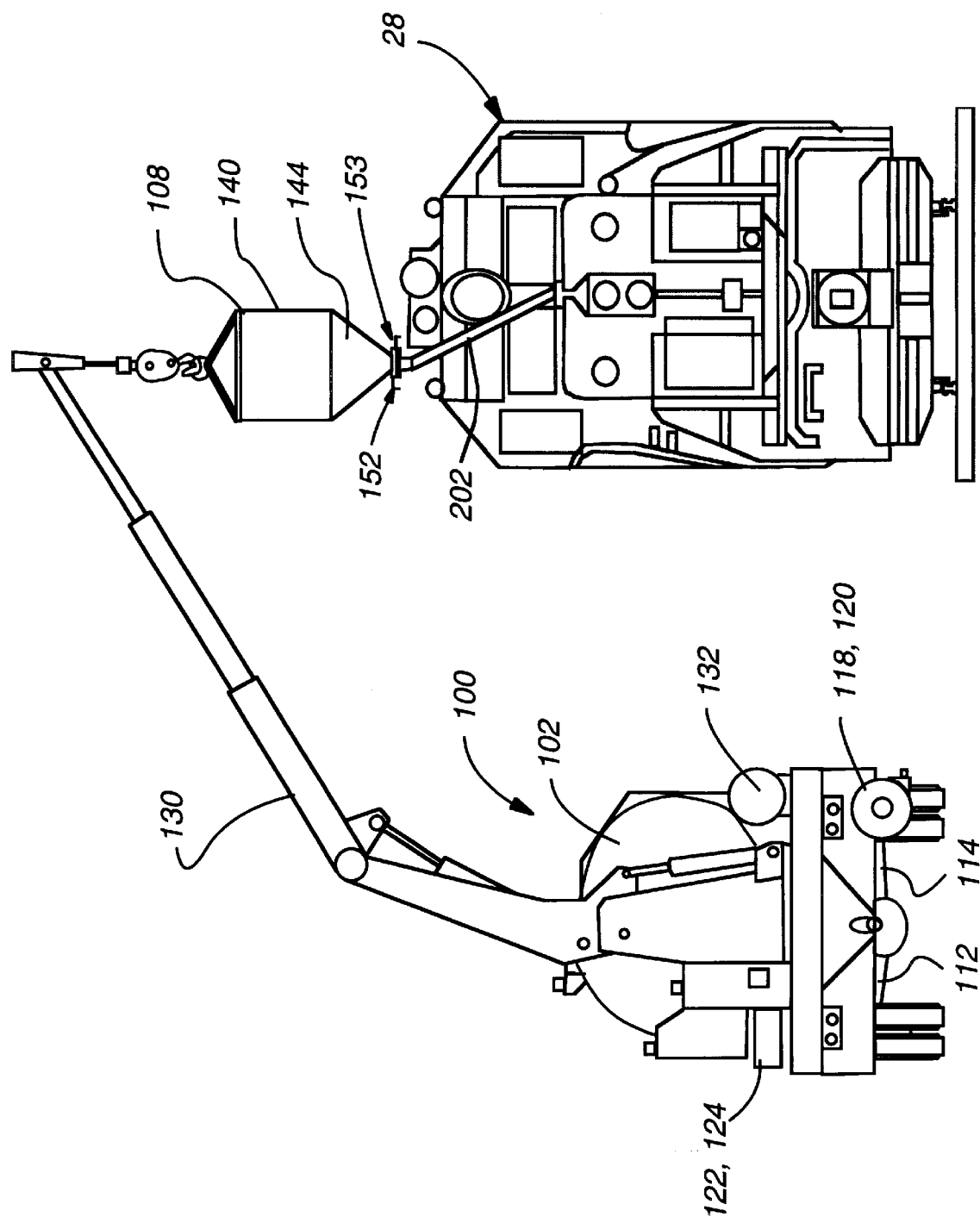

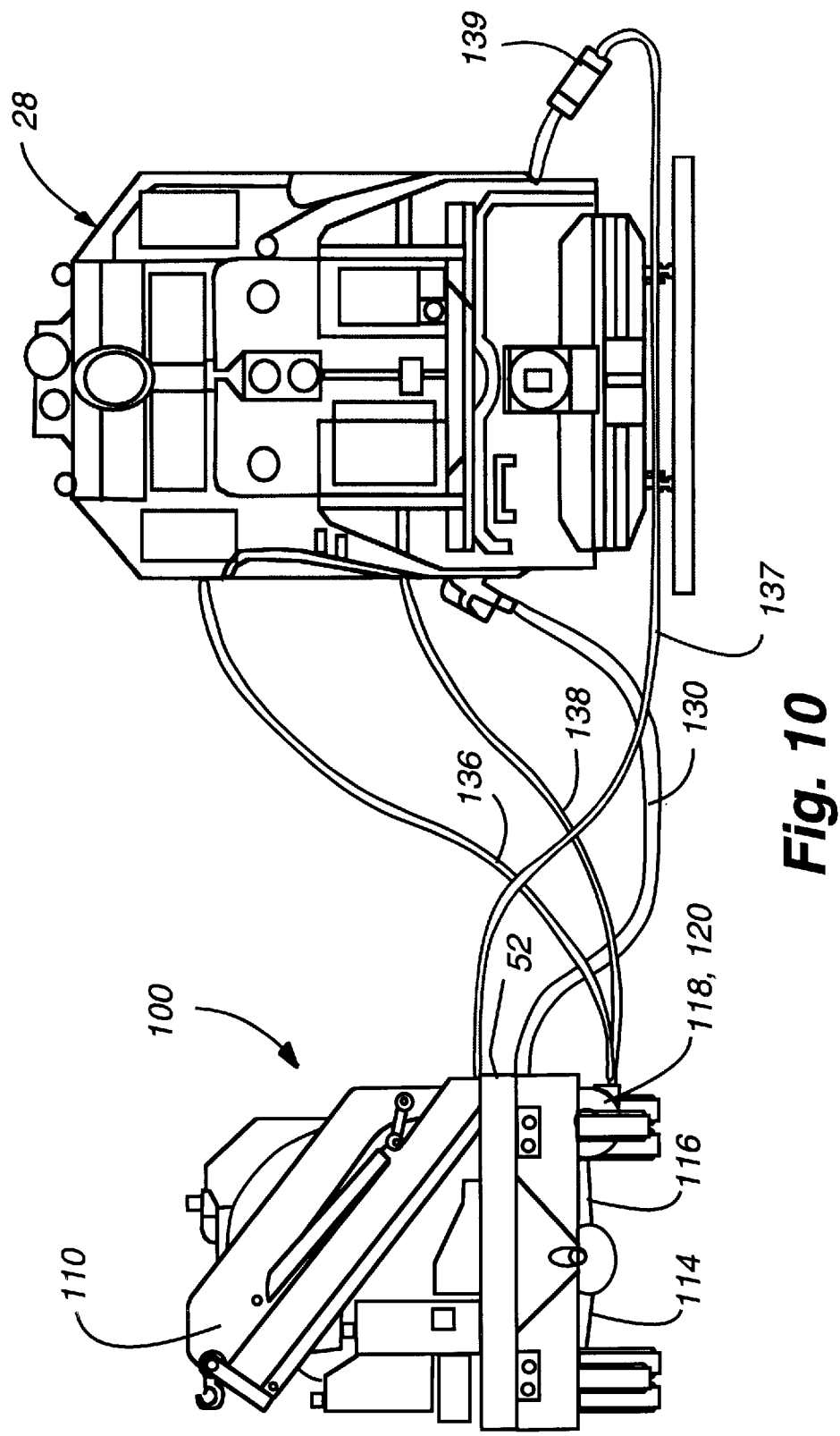

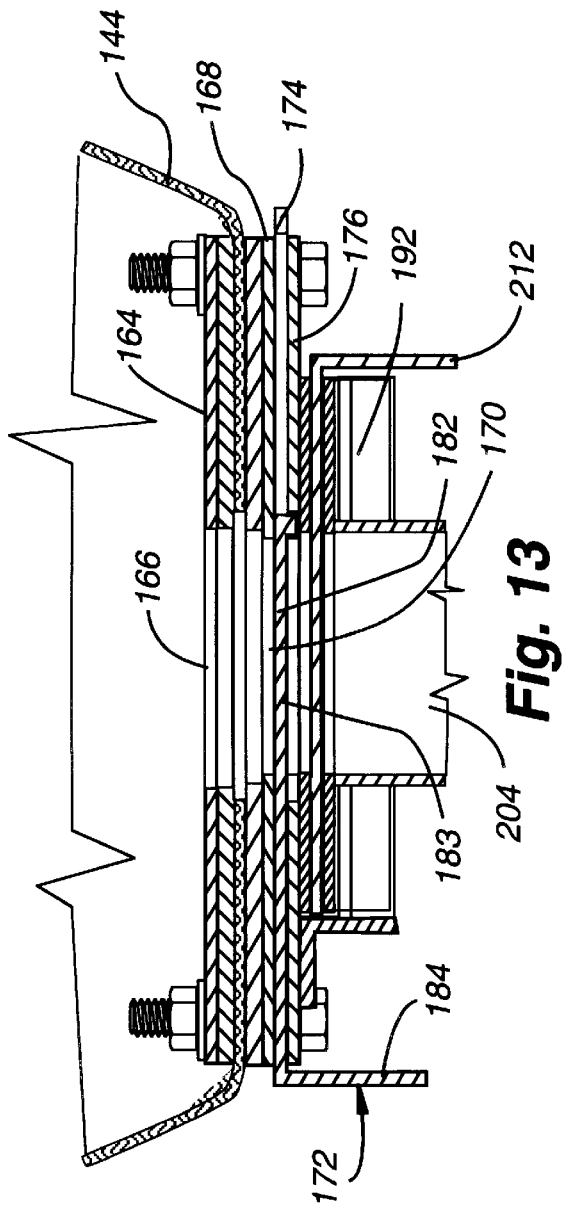
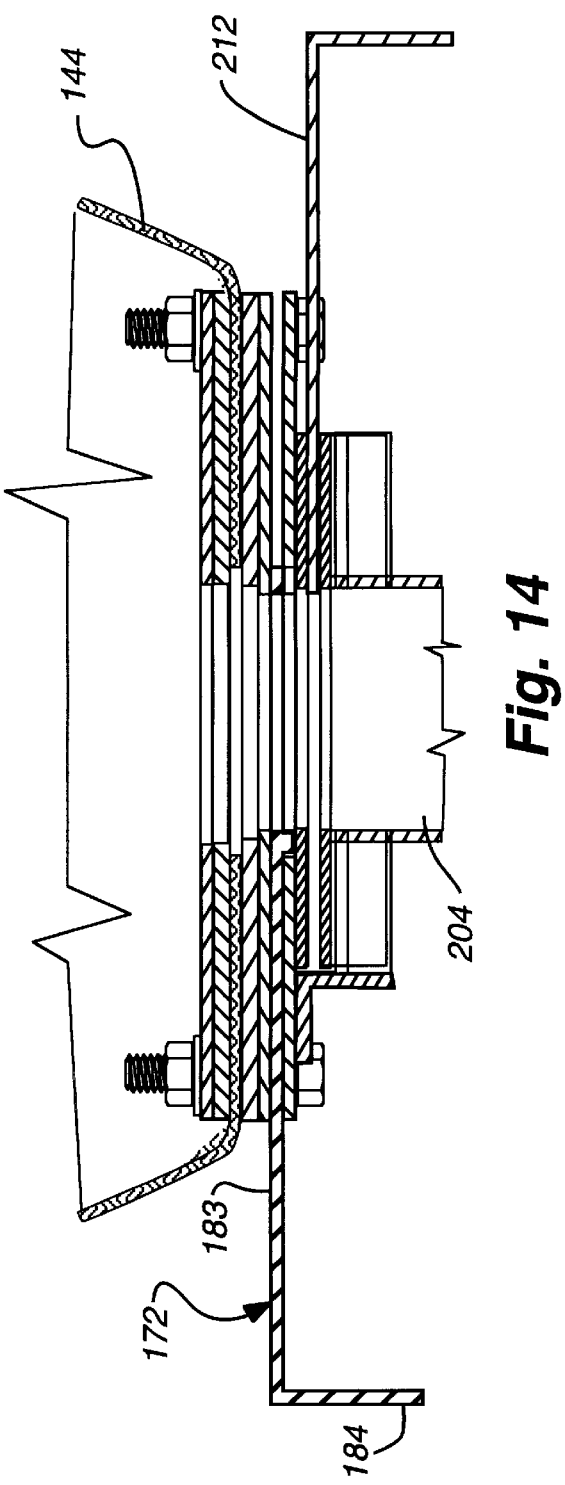

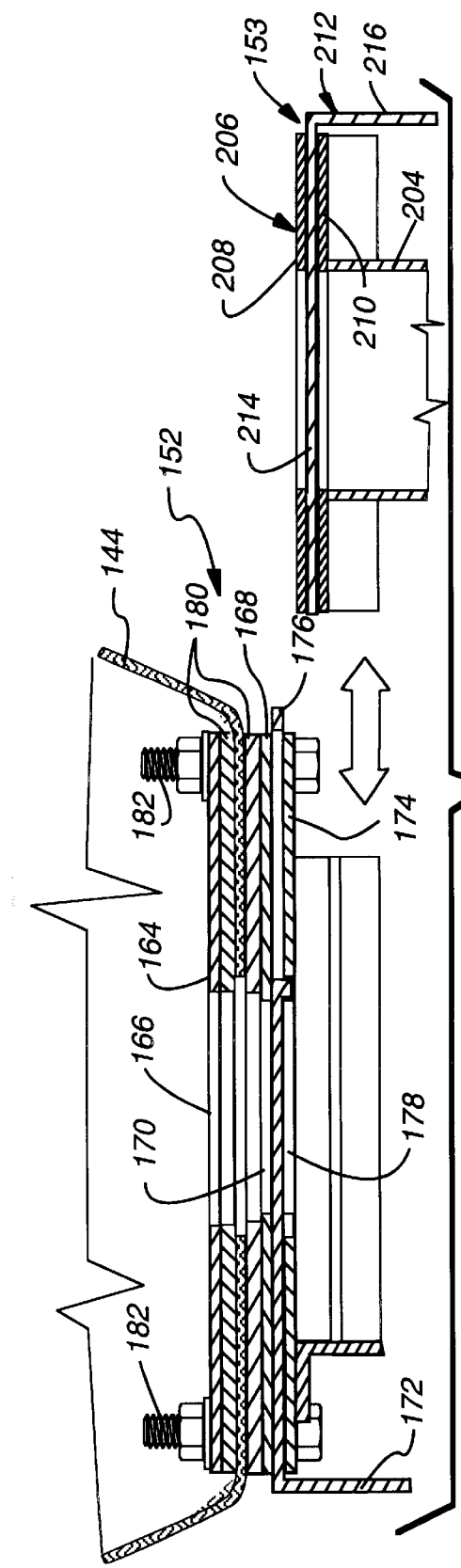
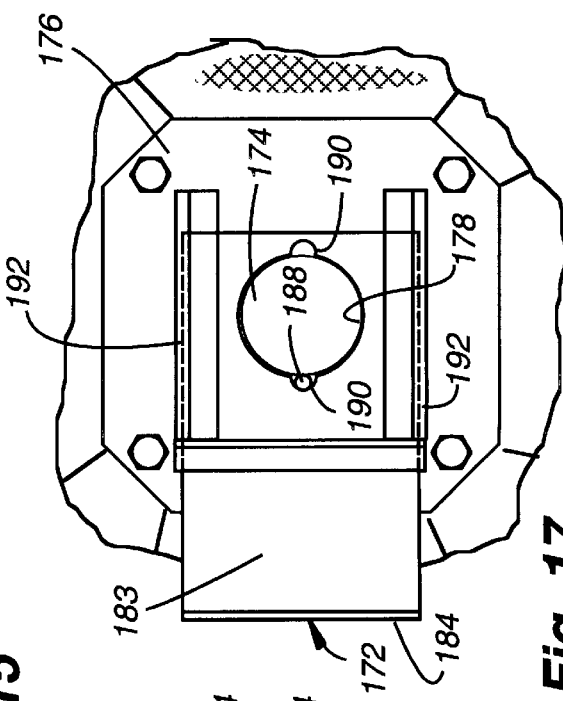
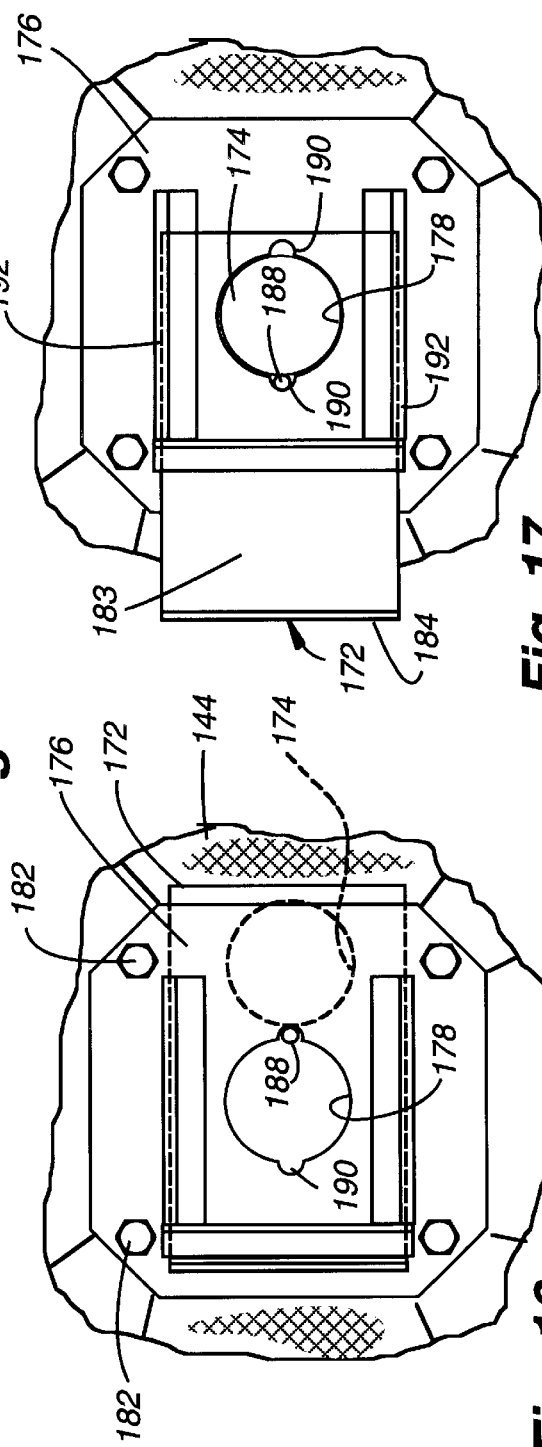

RAILWAY LOCOMOTIVE FUEL SERVICE TRUCK

CROSS REFERENCE TO RELATED APPLICATIONS

This application claims the benefit of U.S. Provisional Application Ser. No. 60/019,960, filed Jun. 14, 1996.

BACKGROUND OF THE INVENTION

1. Field of the Invention

This invention generally relates to motorized vehicles and more particularly to a vehicle adapted for servicing one or more railway locomotive engines within a connected series of locomotives and train cars.

2. Description of the Related Art

Diesel locomotives are generally serviced by uncoupling the locomotive or locomotives from the train and moving the locomotive to a separate service area in a train yard. Here the locomotive can be replenished with fuel, sand, water, and lubricating fluids, and the sanitary tanks emptied and crew quarters serviced as may be required. The locomotive is then returned to and connected to the train of railway cars for subsequent operations.

Alternatively, as the train enters the train yard, the train may be directed through a service area where the locomotives are serviced. This has the disadvantage of the service area being usurped by the entire train.

The locomotives may also be serviced by bringing a tank truck alongside for refueling, and then bringing a service truck alongside that carries a refillable sand hopper for filling the sand pots at the front and rear of each of the locomotives. The sand may be blown by compressed air from containers on the service truck to the sand pots on the locomotive. The service truck may also carry lubricating fluids and consumable supplies as well as waste oil drums to transfer used oil and supply new oil and other lubricating fluids and supplies as necessary. Such a Locomotive fuel service truck is marketed by Fleet Body Equipment of Fort Worth, Tx.

Each of the above mentioned methods of servicing the locomotives is very time intensive as well as inefficient. If the locomotives are disconnected from the train and relocated to a service area, the overall service time involved typically takes several hours. If the train remains intact, the fuel, lubricating fluids, sand, and other consumable materials must be separately trucked to and loaded onto the locomotive. This process may be even slower than the first process discussed above due to truck availability and the extra manpower required. Therefore there is a need for an improved vehicular arrangement for servicing locomotives that minimized the overall service time involved.

SUMMARY OF THE INVENTION

It is therefore an object of the present invention to provide a locomotive service vehicle that carries on board all of the supplies and equipment necessary to replenish consumables and provide the fluids and sand directly to the locomotive or series of locomotives pulling a train.

It is another object of the present invention to provide a locomotive service vehicle equipped with a crane and containers of sand carried thereon to supply sand to the sand pots on a locomotive.

It is another object of the invention to provide a self contained locomotive service vehicle which carries fuel oil and lubricating oil, water, sand, waste oil and waste water collection tanks, fuel oil and lubricating oil transfer pumps and hoses, and waste oil and wastewater transfer pumps and hoses necessary to fully service at least one locomotive directly from the vehicle.

It is a still further object of the invention to provide a service vehicle which carries its own fuel oil supply tanks and transfer pumps and hoses to pump fuel oil from the supply tanks as well as hose connections to permit pumping from a location remote from the service vehicle through the vehicle mounted pump to a locomotive's fuel tanks.

It is a still further object of the invention to provide a service vehicle which carries a plurality of refillable sand hoppers and a crane whereby each of the sand hoppers may be lifted above a locomotive via the vehicle mounted crane and the sand dispensed from the hopper into a locomotive's sand pot.

These and other objects, features and advantages of the present invention will become apparent from the following detailed description when taken in conjunction with the accompanying drawing figures and claims.

BRIEF DESCRIPTION OF THE DRAWING

FIG. 1 is a side view of a Locomotive fuel service truck in accordance with a first embodiment of the present invention.

FIG. 2 is a side view of a Locomotive fuel service truck in accordance with the first embodiment shown in FIG. 1 towing an auxiliary fuel tank trailer.

FIG. 9 is an end elevation view of a diesel locomotive on a railroad track beside a Locomotive fuel service truck in accordance with the second embodiment of the present invention with a sand hopper bag positioned to dispense sand into one of the locomotive's sand pots.

FIG. 10 is a view as in FIG. 9 during a fuel transfer operation from the service truck to the locomotive's fuel tank.

FIG. 13 is a vertical sectional view taken along the line 13—13 in FIG. 12.

FIG. 14 is a vertical sectional view as in FIG. 13 with the discharge valves open.

FIG. 15 is a vertical sectional view through the discharge port and valve assembly with the transfer hose spaced from the discharge port.

FIG. 16 is a partial bottom view of the discharge port and valve assembly of the sand hopper shown in FIG. 1 with the valve closed and the transfer hose removed.

FIG. 17 is a bottom view as in FIG. 16 with the discharge valve open.

DETAILED DESCRIPTION OF THE INVENTION

Figure 3:
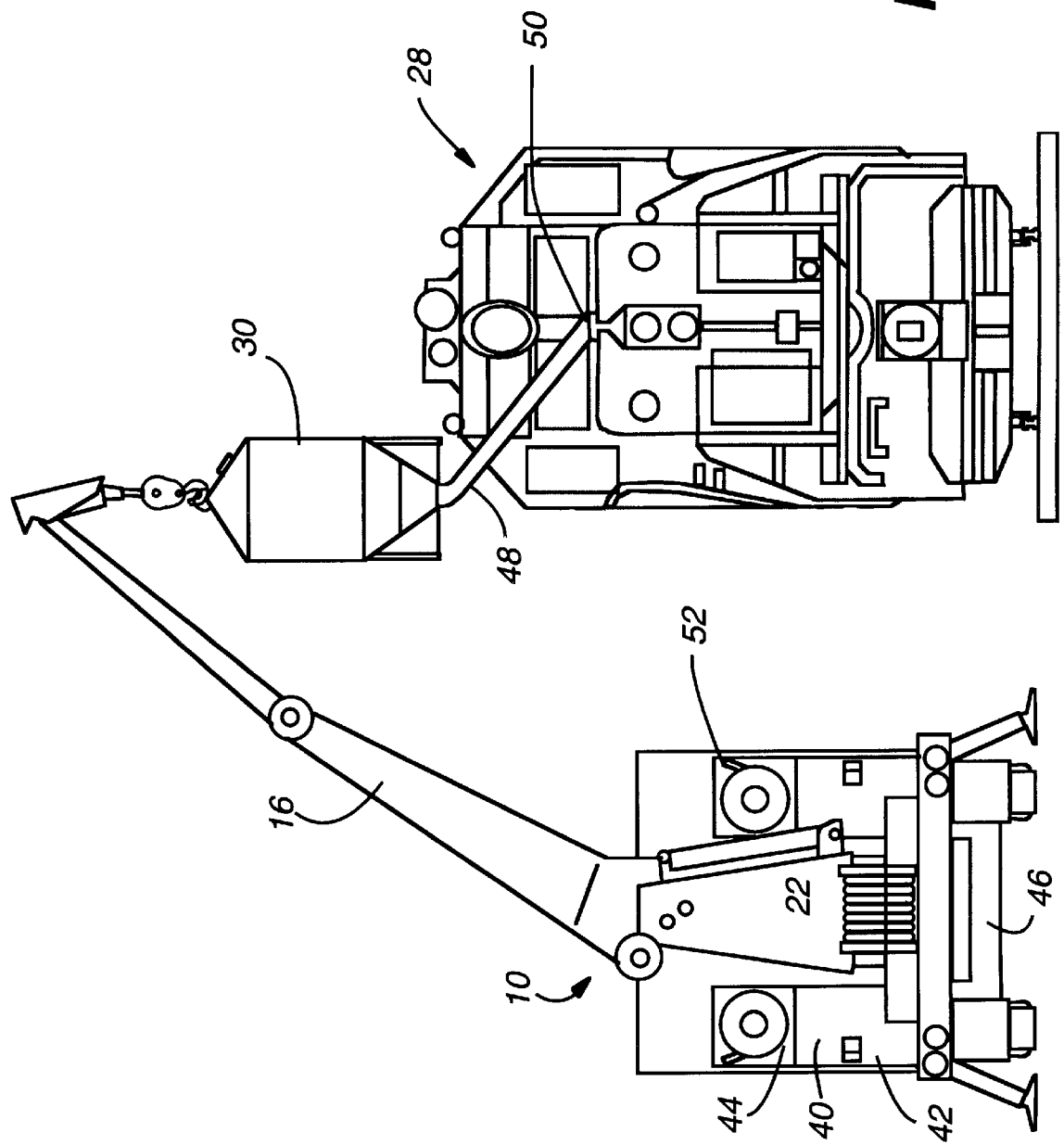
FIG. 3 is an end elevation view of a diesel locomotive on a railroad track beside a Locomotive fuel service truck in accordance with the first embodiment of the present invention with a sand hopper positioned to dispense sand into one of the locomotive's sand pots.

Referring now to the drawing figures, like numerals are used in the various views to identify like components. Although the invention is described and shown with reference to particular embodiments, the invention is not limited to these particular embodiments. The embodiments described herein are provided as examples only. Many modifications, variations and component substitutions may be made without departing from the scope of the present invention as defined by the appended claims.

Figure 4:
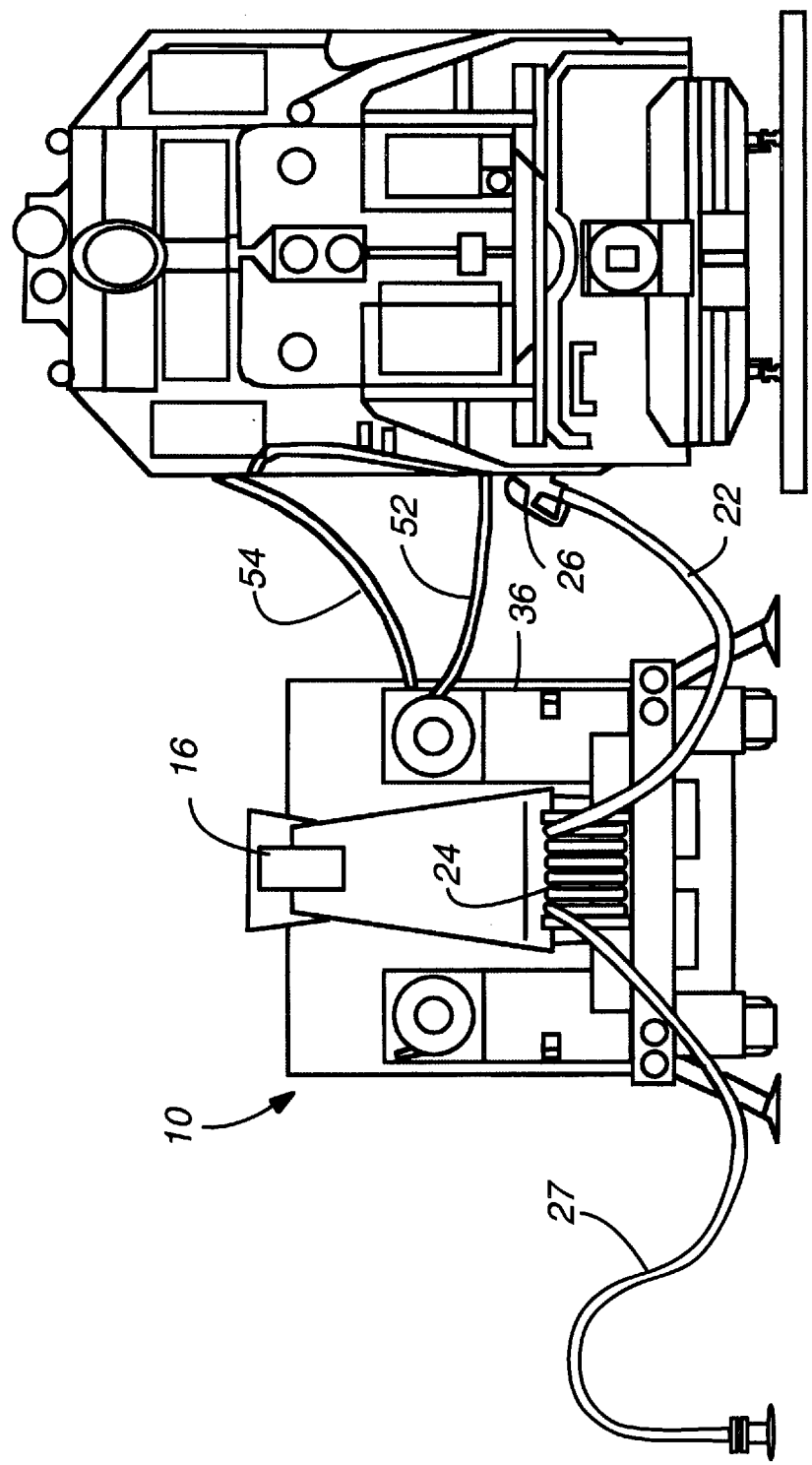
FIG. 4 is view similar to FIG. 3 in which the Locomotive fuel service truck is pumping fuel from an underground supply to the diesel locomotive.
Figure 5:
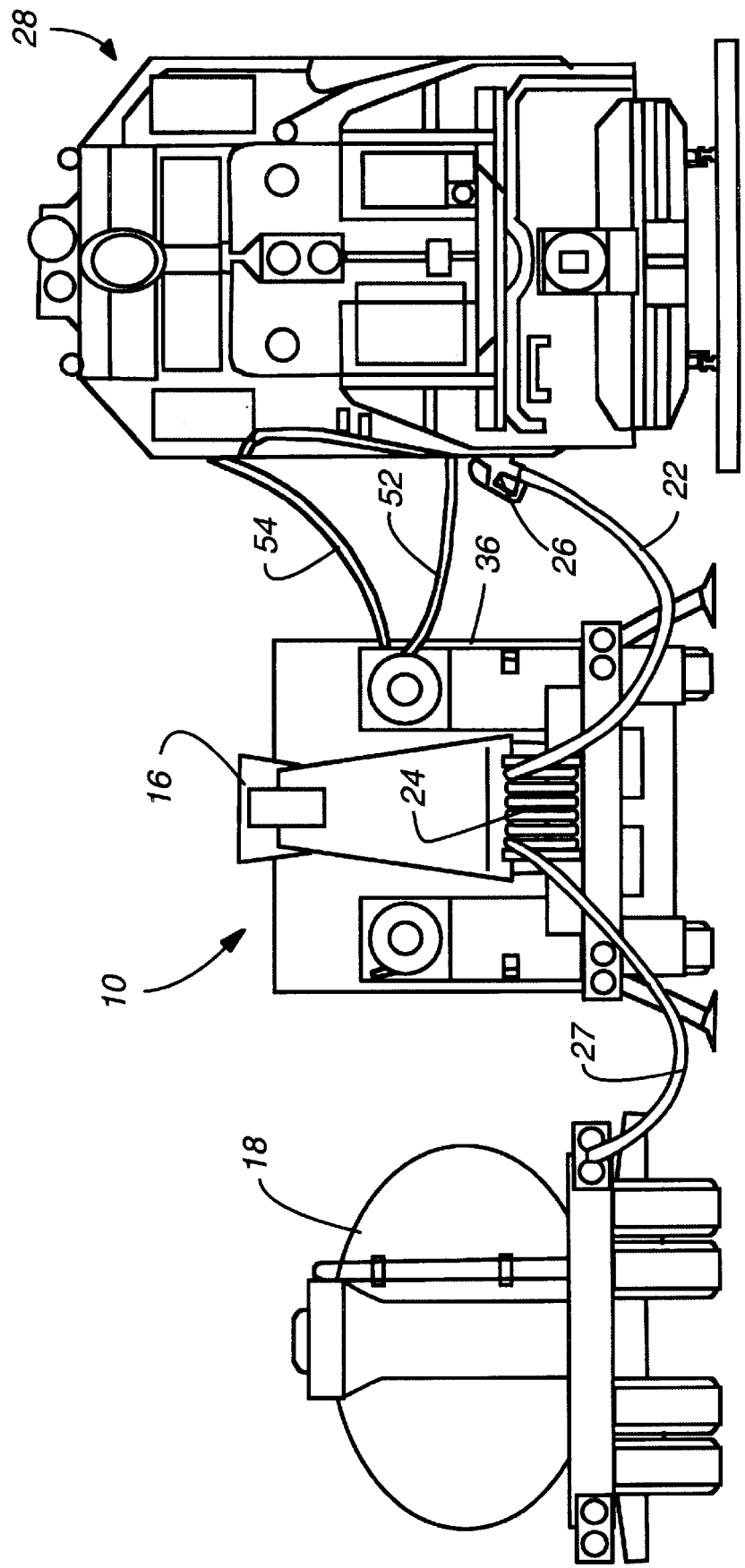
FIG. 5 is a view similar to FIG. 3 in which the Locomotive fuel service truck is pumping fuel into the locomotive fuel tank from the tank trailer shown in FIG. 2.

A locomotive fuel service truck 10 in accordance with a first embodiment of the present invention is shown in FIGS. 1 through 5. Referring first to FIG. 1, the Locomotive fuel service truck (LFST) 10 comprises a motor vehicle 12 having an elongated bed or frame 14, a crane arm 16 carried on the frame 14, a fuel pump 20 carried by the frame 14 connectable to a fuel oil tank 18 and a fuel hose 22 having one end 24 connected to the discharge of the pump 20 and another end 26 adapted to fit into a fuel tank on a diesel locomotive 28 as is shown in FIGS. 4 and 5. The LFST 10 also carries a number of sand hoppers 30 on the frame 14. These sand hoppers 30 may be supported on the truck frame 14 or on a truck bed 32 which is in turn supported by the frame 14. The sand hoppers 30 are handled with the crane arm 16 which is adapted to lift and position the sand hopper 30 from the truck bed 32 to a position over a sand pot port on a diesel locomotive 28. Typically the sand pot ports on the locomotive 28 are filled while fuel is being dispensed from the fuel oil storage tank 18 to a locomotive fuel tank as is shown in FIG. 5. Note that the fuel oil storage tank 18 may be trailer mounted as shown in FIG. 5 or may be underground, in which case the fuel pump 20 takes suction from the underground tank via suction hose 27 as shown in FIG. 4.

The fuel pump 20 is preferably a hydraulic actuated pump such as a Blakmer BLATXD3 230 gpm Diesel pump which is regulated to provide through put of between 130 to 230 gallons per minute. The fuel hose 22 is preferably a 60 foot braided 2½ inch fuel hose with a DTL Snyder fuel nozzle. The fuel is pumped through a truck mounted meter with an accumulator ticket printer and fuel strainer in the discharge line.

The LFST 10 also carries several air actuated pumps and tanks in addition to the fuel pump 20. An air compressor 34 provides about 110 psig air pressure for operating various components. For example, air compressor 34 is connected to an air diaphram oil pump 35 connected to a 600 gallon lubricating oil storage tank 36 mounted on the bed 32 supported by frame 14. A waste oil tank 38 may be connected directly to the lubricating oil sump of the locomotive 28 for gravity drainage of lubricating oil or the waste oil may be pumped from the locomotive sump to the waste oil tank 38 via an air diaphragm waste oil pump. The air compressor 34 also supplies air pressure as needed to operate pneumatic tools or provide compressed air to blow fluids from one location to another.

The LFST 10 also carries an engine coolant storage tank 40 for supplying engine coolant for replenishing the engine coolant as may be needed and a contaminated waste water tank 42 for receiving used engine coolant. Engine coolant is pumped from the coolant storage tank 40 via another air diaphragm water pump 44. A fresh water tank, pump, and hose may also be provided to supply drinking water to the locomotive cab. In addition, the LFST 10 carries a stock of cab supplies as well as paper goods as may be needed. Finally, the LFST 10 may also carry a sanitary waste pump and sewage holding tank 46 for removal of sanitary wastes from the locomotive. Thus the LFST 10 is designed to carry all of the replenishable supplies that may routinely be needed to fully service one or more locomotives without requiring additional vehicles.

Referring now to FIG. 3, a locomotive 28 is shown beside an LFST 10. The crane 16 is extended to place a sand hopper 30 over the sand port on the locomotive. The sand hopper 30 is a metal bin having a conical bottom terminating in a sand discharge valve. Each sand hopper 30 carries up to two cubic yards of sand. A three inch diameter transfer hose 48 has one end connected to the sand valve and the free end of the transfer hose is directed into one of the sand pots on the locomotive 28. A Monroe sand valve (not shown) is provided on the free end 50 of the transfer hose 48. The Monroe sand valve is designed to permit full closure and opening of the passage through the transfer hose under full pressure from the sand in the hopper above as sand flows therethrough without binding. The Monroe valve is located at the free end so that the operator placing the transfer hose into the locomotive sand pot can readily secure filling when the pot is full.

The crane 16 in this first embodiment is a remotely controllable articulated arm crane such as a Duvalt 30 ton truck crane which is hydraulically actuated. The crane arm may be rotated on its base on the truck bed and extends vertically about 36 feet and outward about 25 feet so as to extend a carried sand hopper 30 above and over the top of a locomotive as shown in FIG. 3.

More than a single locomotive is generally needed to pull a string of rail cars. Consequently, the LFST 10 is designed to carry fluid capacities to typically service three locomotives and "top off" their fuel tanks. Because a locomotive typically has a 4000 gallon fuel tank capacity, a single fuel tank trailer may be insufficient to supply the 12,000 gallons needed if the locomotives are almost empty. In this case, either another fuel tank trailer is brought to the site and connected to the LFST 10 as is shown in FIG. 5 or the LFST can take suction from an underground bulk fuel storage tank as is shown in FIG. 4 if one is close by.

As is shown in FIGS. 4 and 5, during the fueling operation lubricating fluid may be transferred from the lubricating oil storage tank 36 to the locomotive 28 via a lubricating oil transfer hose 56. Similarly, engine coolant may be transferred from the water storage tank 40 via a color coded water hose 54. At the same time that refueling is being performed, another operator may replenish and service the locomotive cab with bottled water and other consumable supplies as well as transfer sanitary wastes to the sanitary holding tank 46 on the LFST 10.

Figure 8:
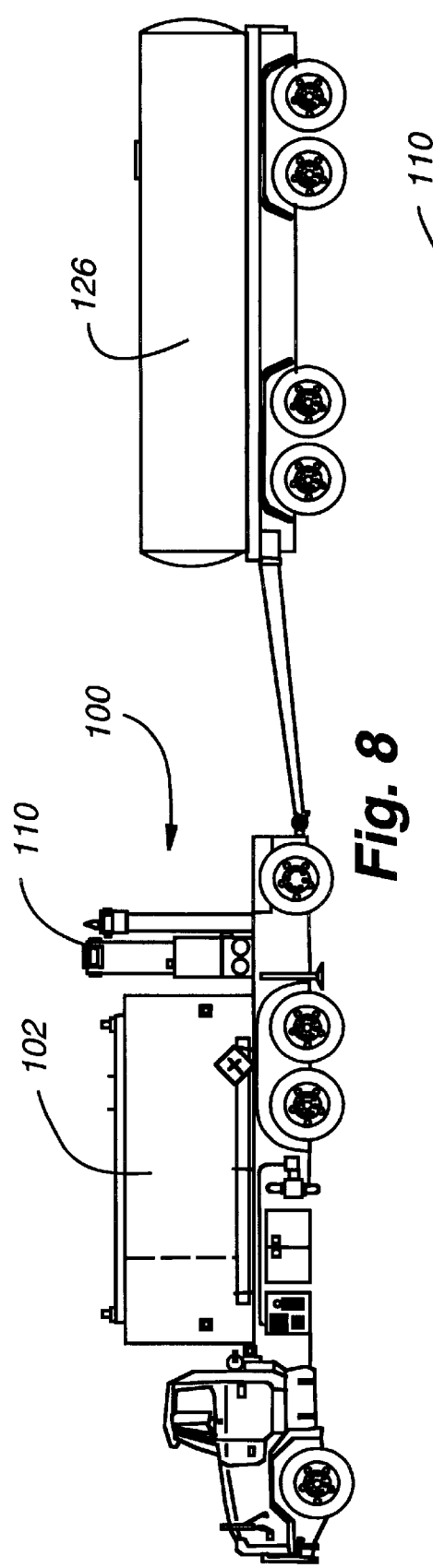
FIG. 8 is a left side view of the second embodiment of the Locomotive fuel service truck in accordance with the invention pulling an auxiliary fuel storage tank trailer.
Figure 7:
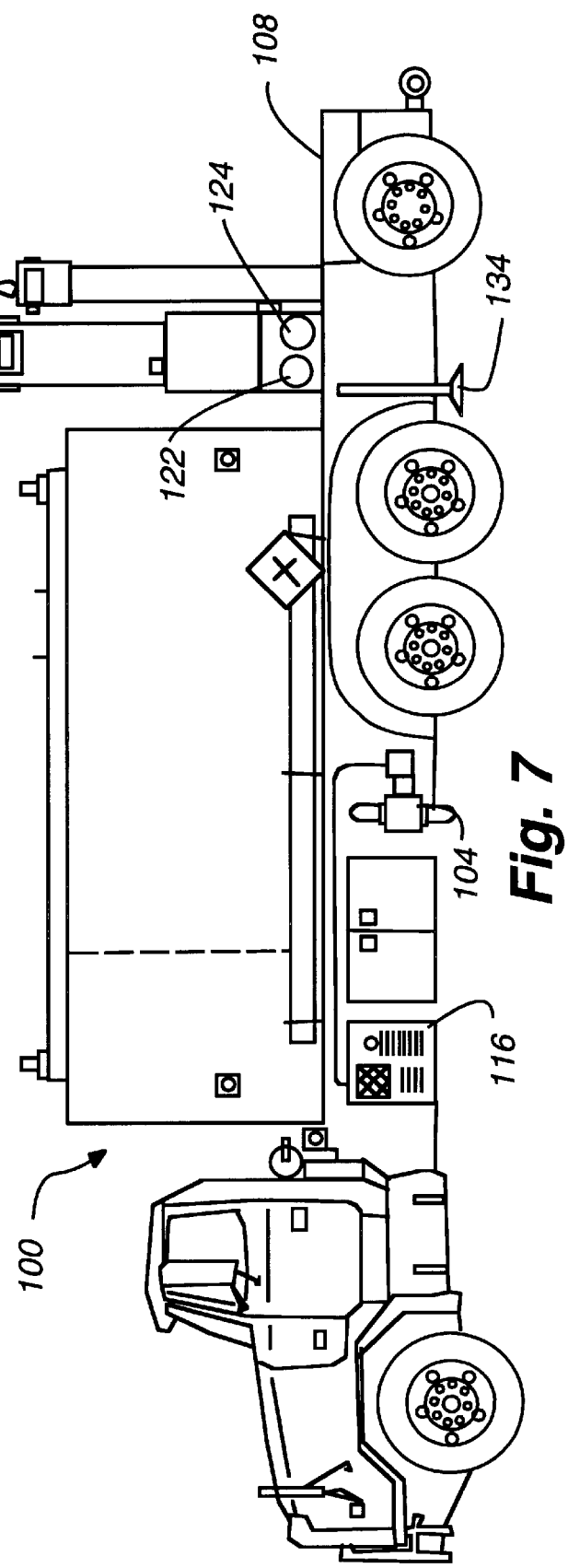
FIG. 7 is a left side view of the second embodiment of the Locomotive fuel service truck in accordance with the invention shown in FIG. 6.

A second embodiment of the Locomotive fuel service truck in accordance with the present invention is illustrated in FIGS. 6 through 10. Referring now to the right side view of FIG. 6, the Locomotive fuel service truck 100 in this second embodiment includes an elongated frame or bed 14 which carries all tanks, pumps, hoses and support equipment. In particular, the LFST 100 carries a 4300+ gallon fuel oil tank 102, a fuel oil transfer pump 104, shown in FIG. 7 and a fuel totalizing meter 106. The rear portion of the bed 14 supports up to four sand hoppers 108 and a hydraulic crane arm 110. Also on or underneath the bed 14 are mounted a lubricating oil storage tank 112, a raw water storage tank 114, an air compressor 116, a lubricating oil hose reel 118, a raw water hose reel 120. Lubricating oil and raw water are transferred via air diaphragm pumps 122 and 124. Additional fuel oil may be transported to the locomotive site on a tanker trailer 126 as is shown in FIG. 8. Optionally, the fuel oil pump 104 may be connected directly to a bulk storage tank or to underground fuel lines as in the first embodiment, depending on the train yard setup.

Figure 6:
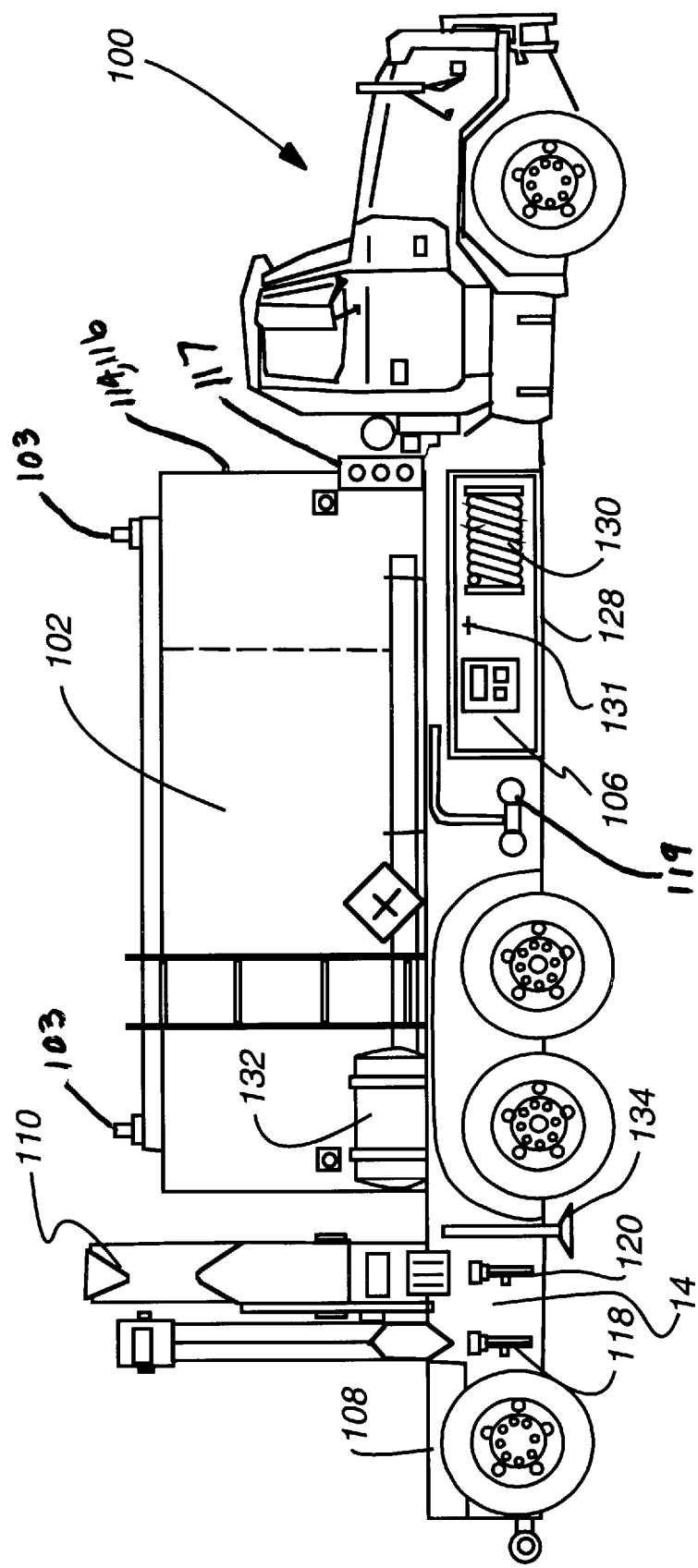
FIG. 6 is a right side view of a second embodiment of the Locomotive fuel service truck in accordance with the present invention.

The fuel oil pump 104 is a hydraulically actuated pump as in the first embodiment which provides a flow rate of between 130–230 gallons per minute and nominally about 210 gallons per minute through a 3 inch fuel hose. As is shown in FIG. 6, the fuel totalizer 106 and the fuel hose 130 are located on the right side of the truck 100 within a cabinet 128. The doors of this cabinet (not shown) are operably connected to a brake interlock 131 which automatically actuates the truck air brakes to lock the LFST 100 in position whenever the fuel cabinet doors are open. Also carried on the right side of the LFST 100 is a spill response kit 132 with absorbent materials for containing any fuel oil spilled during the refueling operation.

The crane arm 110 is a rear mounted hydraulic extension crane such as a Tiger Model T8000H, rated at 8,000 pounds lifting capacity. The crane arm is shown extended over an adjacent locomotive 28 in FIG. 9. Its vertical extension is approximately 36 feet with a horizontal reach of about 25½ feet. The crane arm 110 may be rotated a full 360 degrees. The locomotive fuel service truck 100 also includes hydraulic outriggers 134 at the rear corners to stabilize the crane arm 110 during sand handling operations.

The engine coolant storage tank 114 is part of the front portion of the tank 102 and extends underneath the bed 32 on the driver's side of the vehicle and has about a 600 gallon capacity. An air driven diaphragm water pump 124 provides about 40 gpm water flow from tank 114 through the color coded water hose 136 mounted on the passenger side of the LFST 100.

The engine lubricating oil storage tank 116 is also part of the front portion of the tank 102 and extends under the bed 32 and has a 600 gallon capacity. An air driven diaphragm oil pump 122 provides lubricating oil at about 30 gpm through the color coded oil hose 138 mounted on a take-up reel 118 on the right side of the LFST 100. Thus fuel, water, and oil supplies are all accessible from the passenger or right side of the LFST 100 which is typically positioned adjacent the locomotive 28 being serviced.

In addition, the LFST 100 carries waste oil collection tank, a waste water collection or storage tank, and a sanitary collection tank and associated connecting hoses for receiving these liquids from the locomotive 28. The LFST 100 also may carry a welder and various tools for performing minor repairs on site in addition to consumable supplies that need to be replenished in the locomotive cabs.

Mounted behind the cab of the LFST 100 is a Scully system 117, visible in FIG. 6, which prevents the truck from being overloaded with fuel. This system also is used to prevent the locomotive from being overloaded with fuel oil. The fuel oil tank 102 is also equipped with front and rear fueling operation warning lights 103. The front light 103 is an amber strobe light and the rear light 103 is a white strobe light. Also shown in FIG. 6, s a locomotive overfill return line connection 119.

Figure 11:
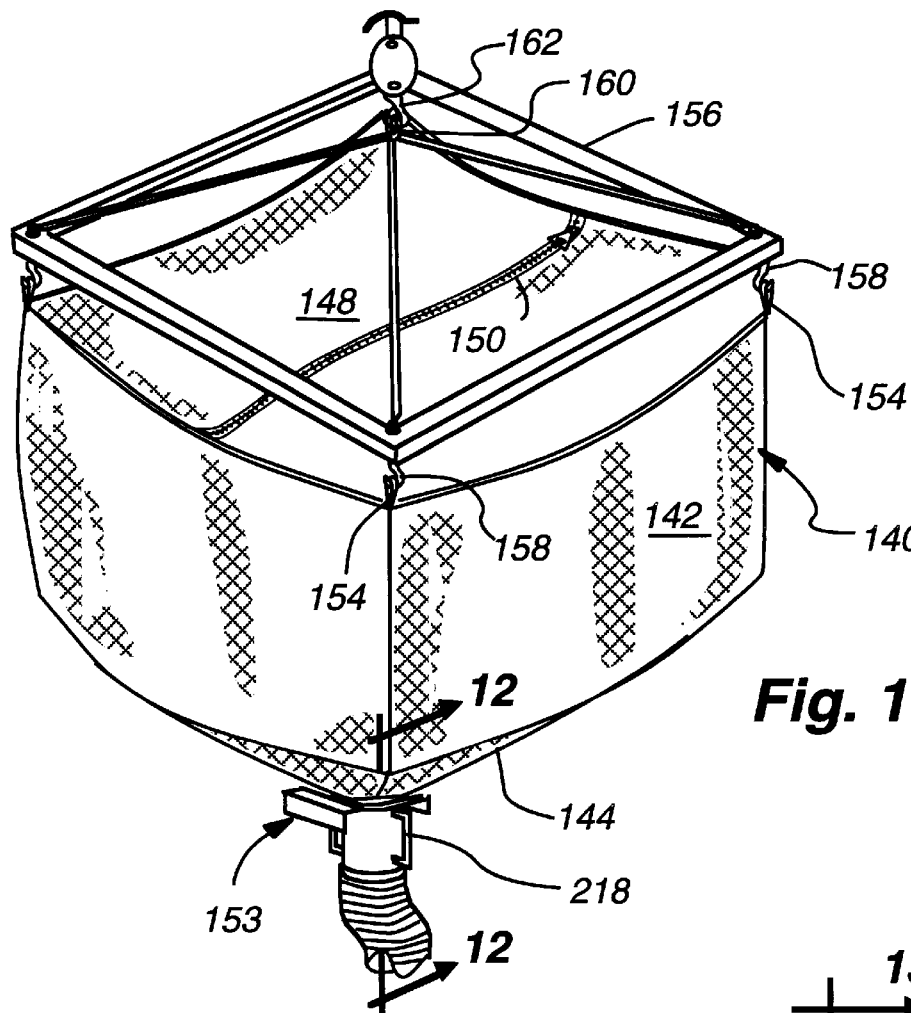
FIG. 11 is a separate perspective view of a sand hopper bag used in the second embodiment in accordance with the present invention and shown in use in FIG. 9.

The sand hopper 108 utilized in this second embodiment differs substantially from that used in the first embodiment. The sand hopper 108 is a plastic fabric bag 140 which carries between about 1500 and 2000 pounds of sand. The bag, shown in perspective in FIG. 11, is a sewn bag which has a generally box shaped upper portion 142 and a tapered or conical bottom portion 144 which terminates in a discharge port or opening 146. The top 148 of the bag 140 is closed by a zipper 150 to retain the sand loaded therein. The discharge port 146 is closed by a unique discharge port valve assembly 152 shown in detail in FIGS. 12 through 17 and described below. The bag 140 is preferably sewn with double stitched seams for strength or the seams may be laser stitched to provide a substantially leak proof enclosure for the sand. The box shaped bag 140 has a lifting loop 154 sewn into each upper corner for attachment to the lifting frame 156. This lifting frame 156 is a square metal frame which has lifting hooks 158 at each corner designed to engage the lifting loops 154 at the upper corners of the bag 140 and has a central lift ring 160 for coupling to the crane arm hook 162. The LFST 100 preferably carries two and may carry four full sand hopper bags 108 of sand on the rear platform of the LFST 100 behind the crane arm 110.

Figure 12:
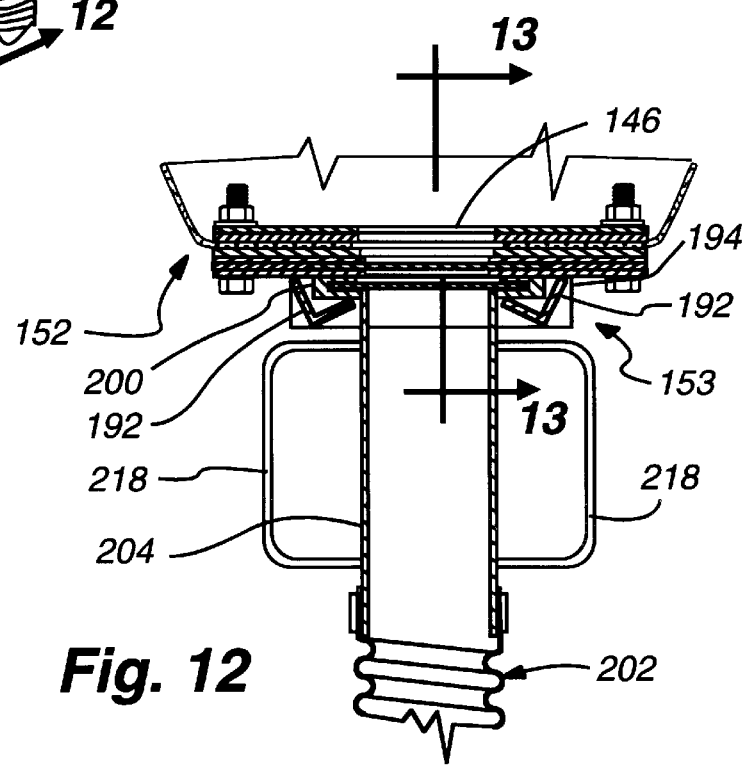
FIG. 12 is a vertical sectional view through the discharge port and valve assembly on the sand hopper bag taken along line 12—12 in FIG. 11.

A sectional view through the bag discharge valve assembly 152 and transfer hose flange valve connection 153 is shown in FIGS. 12–14. The discharge valve assembly 152 comprises an inner plate 164 having a central aperture 166 therethrough, an outer plate 168 having a central aperture 170 therethrough, a sliding valve gate plate 172 also having a central aperture 174 therethrough, and an outer valve plate 176 having a central aperture 178 therethrough. The inner and outer plates 164 and 168 sandwich a pair of gaskets 180 which in turn sandwich the lower end of the tapered portion 144 of the bag 140 and surround the central port 146 therethrough. Each of the apertures 166, 170, and 178 in the plates 164, 168, and 176 are coaxially aligned with the port 146 at the bottom of the bag 140 to form a through passage for the sand. The outer valve plate 176 and the outer plate 168 are closely spaced apart so that the valve gate plate 172 may slide back and forth therebetween transversely to the passage.

The discharge valve 152 is open when the aperture 174 through the gate plate 172 is aligned with the apertures through the plates 164, 168, and 176 as shown in FIG. 14. The discharge valve 152 is closed when the gate plate is pushed in as shown in FIGS. 13 and 15. The outer plate 168 and the outer valve plate 176 are spaced apart to provide space for movement of the valve gate plate 172 by flat spacer washers (not shown) around the bolts 182 holding the plates together and fastening the inner and outer plates to the bag fabric around the discharge port 146.

The valve gate plate 172 is preferably a generally rectangular aluminum or steel plate which has a gate portion 183 and a handle portion 184 bent at right angles to the gate portion. The gate portion 183 has an aperture 174 therethrough near the end opposite the handle portion 184. The gate portion 183 also has a solid portion between the aperture 174 and the handle portion 184 long enough and wide enough to close off the passage through the plates when the gate plate 172 is in the closed position as shown in FIGS. 13 and 15. To prevent the gate plate 172 from slipping out of the space between the outer plate 168 and the outer valve plate 176, the gate portion 184 of the valve gate plate 172 has an outwardly projecting nodule or pin 188 adjacent the aperture therethrough. This pin 188 fits within one of a pair of U shaped cutouts or notches 190 on opposite sides of the aperture 178 through the outer valve plate 176 when the valve gate plate 172 is fully inserted as shown in FIG. 16 and engages the other cutout or notch 190 when the valve gate plate 172 is fully withdrawn as shown in FIGS. 14 and 17.

The outer valve plate 176 has a pair of angle stock pieces 192 each having one edge welded to the outer surface of the outer valve plate 176 in parallel relation on opposite sides of the central aperture 178 through the valve plate 176. These angle strips 192 are oriented at an acute angle to the surface of the outer valve plate 176 and form a pair of parallel channels which receive the flange 200 on the sand transfer hose 202. Another piece of angle stock 194 has one side welded to the outer surface of the outer valve plate 176 and against the ends of the angle strips 192, thus forming a pair of opposing closed slots for receiving the flange on the upper end fitting 153 of the sand transfer hose 202.

The upper end fitting 153 of the sand transfer hose 202 includes a solid metal tube 204 having its lower end joining the upper end of the flexible transfer hose. The fitting 153 has a transverse rectangular flange 206 at the upper end of the tube sized to slide within the opposing closed slots formed by the angle stock pieces 192 welded to the outer valve plate 176 and align the central opening of the tube 204 with the passage through the discharge port 146 of the sand hopper bag 108. The flange 206 includes an upper plate 208 and a lower plate 210 which together sandwich a transfer hose gate plate 212 therebetween. This transfer hose gate plate 212 has a flat gate portion 214 and a bent handle portion 216. When the gate portion 214 is fully inserted within the flange 206, the opening into the passage through the transfer hose is closed off. When the gate portion 214 is withdrawn, the opening into the transfer hose passage is open at the upper end. The upper end flange fitting 153 also includes a pair of generally "C" shaped handles 218 welded to or otherwise fastened on opposite sides of the tube of the upper end fitting to enable an operator to quickly maneuver and connect the hose by sliding the flange into the channels of the discharge valve assembly on the bag 108. The upper end flange fitting 153 may also optionally include a latch (not shown) to engage a feature on the discharge valve assembly to positively secure the flange fitting to the discharge valve assembly 152 on the bag 108.

The discharge valve assembly plates and components may be manufactured from aluminum stock or any suitable material such as steel or a tough polymeric material that is capable of withstanding the expected component loads. However, if plastics are used, care must be exercised to choose a material that will retain its strength and ductility at very low temperatures in order to remain functional in winter and in the arctic climates.

The sand hopper bag 140 is preferably made of a heavy, closely woven polypropylene material with double folded and stitched seams to minimize sand loss during storage and handling. Other materials may also be used as well as other shapes. For example, a cylindrical bag with a true conical lower portion may alternatively be utilized. Such a design minimizes the number of seams and thus minimizes the potential for sand loss. Laser stitching of the seams may also be advantageously employed to close these seams.

Referring now specifically to FIG. 10, the LFST 100 is shown beside a diesel locomotive 28 during the refueling operation. In parallel with the connection of the fuel transfer hose 130 from the fuel pump 104 to the fuel tank on the locomotive 28, a recirculation path through a recirculation hose 137 is provided, attached from the overfill pipe on the locomotive fuel tank to the fuel storage tank 102 via the locomotive overfill return line connection 119 shown in FIG. 6. This recirculation hose 137 passes underneath the locomotive 28 to the overfill pipe on the opposite side of the locomotive and has an in line flow sensor 139 which automatically shuts off the fuel transfer pump in the event that the locomotive fuel tank is overfilled and fuel oil begins to be pumped back to the LFST 100. This automatic flow sensor may optionally provide an alarm function to alert the operator of the overfilled condition and may also sense a change in air pressure in the vent line in order to actuate in advance of actually sensing liquid flow. This feature provides a completely closed fuel transfer system to prevent release of undesirable fumes to the environment.

The locomotive fuel service truck (LFST) operating service procedure will now be described with reference to the second embodiment above described. It is to be understood, however, that the procedure applies equally well to the first embodiment set forth above. The locomotive fuel service truck (LFST) operating service procedure for a train which includes a series of three locomotives connected to a string of cars proceeds as follows with the LFST 100 approaching the train from the front.

The LFST 100 is first positioned such that the crane can reach the sand port on the front of the lead locomotive. The truck operator then uses the crane to pick up a sand hopper, position the hopper over the sand pot port, which allows the railroad employee to direct the flexible hose with a Monroe sand valve on top of the port. This valve is then opened to fill the sand pot. This sand transfer operation typically takes about three minutes.

The LFST is then be moved ahead so that the crane is positioned between the first and second locomotives. The rear fueling hose from the LFST is placed in the lead locomotive fuel tank and the front LFST fueling hose is placed in the number two locomotive fuel tank. The fuel pump on the LFST then fills both locomotive fuel tanks from the LFST fuel tank. Optionally, if the locomotive fuel tanks are almost completely empty, a separate tanker may optionally be brought up and connected to the LFST fueling header. The LFST fuel pump then transfers fuel from the tanker to the two locomotives while the crane is operated to move the sand hopper first to the rear sand pot on the lead locomotive and fill this pot with sand and then move the sand hopper to the front sand pot on the second locomotive and fill this front sand pot with sand. At the same time the LFST operator can take water and oil hoses stored on the LFST and service locomotives number one and two with lubricating oil and cooling water. The LFST operator can also then supply the required cleaning aids, toilet supplies, drinking water, etc to the locomotive cab as may be needed.

The LFST is then moved ahead so that the crane is positioned between the second and the third locomotive. The tanker truck is also moved forward and connected to the LFST and through the LFST to the third locomotive fuel tank. The LFST operator operates the crane to position another sand hopper to fill the rear sand pot on the second locomotive and the front sand pot on the third locomotive. The crane is then moved so that the rear sand pot on the third locomotive may be reached and filled via the sand hopper on the end of the crane arm. The LFST operator may also hook up and supply lubricating oil and water to the second and third diesel locomotives as needed.

What is claimed is:

1. A sand hopper for dispensing sand through a tube inserted into a sand pot in a locomotive, said sand hopper comprising:

a fabric bag having a closeable upper end and a generally tapered lower end narrowing to a central port therethrough;

a discharge valve assembly closing said central port, said valve assembly comprising a generally flat inner plate and a generally flat outer plate sandwiching said lower end of said fabric bag around said central port, each of said plates having a central aperture therethrough coaxially aligned with said central port;

an outer valve plate spaced from said outer plate, said outer valve plate having a central aperture therethrough coaxially aligned with said central port; and a valve blade plate slidably disposed between said outer plate and said outer valve plate operable to selectively close said central port;

said outer valve plate having a pair of parallel guide rails fastened to one side of said plate and spaced from said central aperture, said guide rails adapted to receive and hold a flanged upper end of a sand transfer tube in axial alignment with said central aperture.

2. The sand hopper according to claim 1 wherein said upper portion of said bag has four generally flat sides and a lifting loop sewn to each of the four corners joining said flat sides.

3. The hopper according to claim 1 wherein said valve further comprises a stop bar fastened between said guide rails at right angles to said outer valve plate at one end of the pair of guide rails to stop further movement of said flanged end of said tube inserted between said guide rails.

4. The hopper according to claim 3 wherein each of said guide rails is an elongated member having an L shaped cross section and having one edge of the member fastened to the outer valve plate so as to form a channel receiving a portion of said flanged end of said tube.

5. The hopper according to claim 4 wherein said guide rails and said stop bar are welded to said outer valve plate.

6. The hopper according to claim 1 wherein said blade plate is an elongated, generally rectangular plate member having a central aperture adjacent one end and a projecting pin adjacent said aperture for engaging one of said outer plate or said outer valve plate when said aperture through said blade plate is aligned with said central port and when said gate blade closes said central port.

7. The hopper according to claim 6 wherein said outer valve plate has a pair of opposing notches open to said central aperture for receiving said pin.

8. The hopper according to claim 1 wherein said flanged upper end of said transfer hose comprises a tubular portion and a flange valve portion, said flange valve portion having a sliding gate valve plate therein operable to close and open said upper end of said transfer hose when said flanged upper end is fastened to said outer valve plate.

9. The hopper according to claim 1 wherein said bag is made of a plastic fabric.

10. The hopper according to claim 1 wherein said closeable top of said bag further comprises a zipper closure.

11. The hopper according to claim 1 wherein said discharge valve assembly plates are made of aluminum.

12. The hopper according to claim 1 further comprising a pair of gaskets between said inner plate and said outer plate sandwiching said lower end of said bag around said central aperture.

* * * * *